United States Patent
Och et al.

(10) Patent No.: US 8,645,119 B2
(45) Date of Patent: Feb. 4, 2014

(54) MINIMUM ERROR RATE TRAINING WITH A LARGE NUMBER OF FEATURES FOR MACHINE LEARNING

(75) Inventors: Franz Josef Och, Palo Alto, CA (US); Michael E. Jahr, San Francisco, CA (US); Ignacio E. Thayer, San Francisco, CA (US)

(73) Assignee: Google Inc., Mountain View, CA (US)

( * ) Notice: Subject to any disclaimer, the term of this patent is extended or adjusted under 35 U.S.C. 154(b) by 1462 days.

(21) Appl. No.: 12/056,083

(22) Filed: Mar. 26, 2008

(65) Prior Publication Data
US 2013/0144593 A1  Jun. 6, 2013

Related U.S. Application Data

(60) Provisional application No. 60/920,242, filed on Mar. 26, 2007.

(51) Int. Cl.
*G06F 17/28* (2006.01)

(52) U.S. Cl.
USPC .......................................................... 704/2

(58) Field of Classification Search
USPC .......................................................... 704/2
See application file for complete search history.

(56) References Cited

U.S. PATENT DOCUMENTS

2009/0048822 A1* 2/2009 Chen et al. ........................ 704/4

OTHER PUBLICATIONS

A. Lopez et al., Word-Based Alignment, Phrase-Based Translation: What's the Link?, Aug. 2006, Proceedings of the 7th Conference of the Association for Machine Translation in the Americas, pp. 90-99.*
Deborah Coughlin, Correlating automated and human assessments of machine translation quality, 2003, Proceedings of MT Summit XI, pages, entire document.*
Santanjeev Banerjee et al., METEOR: An automatic metric for MT evaluation with improved correlation with human judgment, Jun. 2005, Proceedings of the ACL workshop on Intrinsic and Extrinsic evalutation measures for machine translation and/or summarization, pp. 65-72.*
Alon Levie et al., The significance of recall in automatic metrics for MT evaluation, 2004, Language Technologies Institute, pp. 134-143.*
Tadashi Nomoto, Multi-Engine Machine Translation with Voted Language Model, 2004, Proceedings of the 42nd Annual Meeting of the Association of Computational Linguistics, entire document.*
Stefan Riezlar et al, On some pitfalls in automatic evaluation and significance testing for MT, Jun. 2005, Proceedings of the ACL workshop on Intrinsic and Extrinsic evalutation measures for machine translation and/or summarization, pp. 57-64.*
Joseph Turian et al., Evaluation of machine translation and its evaluation, 2003, In Proceedings of MT Summit IX, entire document.*
Cettolo, M., and Marcello, F. Minimum Error Training of Log-Linear Translation Models. In *Proceedings of the International Workshop on Spoken Language Translation (IWSLT)*, pp. 103-106, Kyoto, Japan. Oct. 2004.

(Continued)

*Primary Examiner* — Jakieda Jackson
(74) *Attorney, Agent, or Firm* — Renmarck Law Group PLC

(57) ABSTRACT

Systems, methods, and apparatuses including computer program products for machine learning. A method is provided that includes determining model parameters for a plurality of feature functions for a linear machine learning model, ranking the plurality of feature functions according to a quality criterion, and selecting, using the ranking, a group of feature functions from the plurality of feature functions to update with the determined model parameters.

20 Claims, 6 Drawing Sheets

(56) References Cited

OTHER PUBLICATIONS

Chiang, D. A Hierarchical Phrase-based Model for Statistical Machine Translation. In *Proceedings of the 43rd Annual Meeting of the Association of Computational Linguistics (ACL)*, pp. 263-270, Ann Arbor, MI, USA. Jun. 2005.

Gao, J., et al. Minimum Sample Risk Methods for Language Modeling. In *Proceedings of the Human Language Technology Conference and Conference on Empirical Methods in Natural Language Processing (HLT-EMNLP)*, pp. 209-216, Vancouver, BC, Canada. Oct. 2005.

Koehn, P., et al. Statistical Phrase-based Translation. In *Proceedings of the Human Language Technology Conference/North American Chapter of the Association for Computational Linguistics Annual Meeting (HLT-NAACL)*, pp. 48-54, Edmonton, AB, Canada. May-Jun. 2003.

Liang, P., et al. An End-to-End Discriminative Approach to Machine Translation. In *Proceedings of the 21st International Conference on Computational Linguistics and the 44th Annual Meeting of the Association of Computational Linguistics (ACL)*, pp. 761-768, Sydney, Australia. Jul. 2006.

Marcu, D., et al. SPMT: Statistical Machine Translation with Syntactified Target Language Phrases. In *Proceedings of the Conference on Empirical Methods in Natural Language Processing (EMNLP)*, pp. 44-52, Sydney, Australia. Jul. 2006.

Och, F.J., and Ney, H. Discriminative Training and Maximum Entropy Models for Statistical Machine Translation. In *Proceedings of the 40th Annual Meeting of the Association for Computational Linguistics (ACL)*, pp. 295-302, Philadelphia, PA, USA. Jul. 2002.

Och, F.J. Minimum Error Rate Training in Statistical Machine Translation. In *Proceedings of the 41st Annual Meeting of the Association for Computational Linguistics (ACL)*, pp. 160-167, Sapporo, Japan. Jul. 2003.

Och, F.J., and Ney, H. The Alignment Template Approach to Statistical Machine Translation. *Computational Linguistics*, 30(4):417-449. 2004.

Papineni, K., et al. BLEU: A Method for Automatic Evaluation of Machine Translation. In *Proceedings of the 40th Annual Meeting of the Association for Computational Linguistics (ACL)*, pp. 311-318, Philadelphia, PA, USA. Jul. 2002.

Roark, B., et al. Discriminative Language Modeling with Conditional Random Fields and the Perceptron Algorithm. In *Proceedings of the 42nd Annual Meeting of the Association for Computational Linguistics (ACL)*, Barcelona, Spain. Jul. 2004.

Shen, L., et al. Discriminative Reranking for Machine Translation. In *Proceedings of the Human Language Technology Conference/North American Chapter of the Association for Computational Linguistics Annual Meeting (HLT-NAACL)*, Boston, MA, USA. May 2004.

Ueffing, N., et al. Generation of Word Graphs in Statistical Machine Translation. In *Proceedings of the Conference on Empirical Methods in Natural Language Processing (EMNLP)*, pp. 156-163, Philadelphia, PA, USA. Jul. 2002.

Zens, R., and Ney, H. *N*-Gram Posterior Probabilities for Statistical Machine Translation. In *Proceedings of the Human Language Technology Conference/North American Chapter of the Association for Computational Linguistics Annual Meeting (HLT-NAACL)*, pp. 72-77, New York, NY, USA. Jun. 2006.

Dean, J., and Ghemawat, S. MapReduce: Simplified Data Processing on Large Clusters. In *Proceedings of the OSDI '04: 6th Symposium on Operating Systems Design and Implementation*, pp. 137-149, San Francisco, CA, USA. Dec. 2004.

\* cited by examiner

MINIMUM ERROR RATE TRAINING WITH A LARGE NUMBER OF FEATURES FOR MACHINE LEARNING

CROSS-REFERENCE TO RELATED APPLICATIONS

This application claims the benefit under 35 U.S.C. §119(e) of U.S. Provisional Patent Application No. 60/920,242, titled "Minimum Error Rate Training with Millions of Features for Statistical Machine Translation," filed Mar. 26, 2007, which is incorporated here by reference.

BACKGROUND

This specification relates to machine learning.

Manual translation of text by a human operator can be time consuming and costly. One goal of machine translation is to automatically translate text in a source language to corresponding text in a target language. There are several different approaches to machine translation including example-based machine translation and statistical machine translation. Statistical machine translation attempts to identify a most probable translation in a target language given a particular input in a source language. For example, when translating a sentence from French to English, statistical machine translation identifies the most probable English sentence given the French sentence.

A commonly used training technique in statistical machine translation is the Minimum Error Rate Training (MERT) technique. The MERT technique is described, for example, in Franz Josef Och, "Minimum Error Rate Training in Statistical Machine Translation," Proceedings of the 41 st Annual Meeting on the Association for Computational Linguistics, pages 160-167, July 2003.

Many conventional statistical machine translation systems use the MERT technique. The MERT technique trains parameters for a linear statistical machine translation model directly with respect to automatic evaluation metrics, i.e., metrics that do not require human evaluation, which can be time-consuming. Some examples of automatic evaluation metrics include word error rate, position independent error rate, National Institute of Standards and Technology (NIST) score, and Bilingual Evaluation Understudy (BLEU) score.

The MERT technique directly optimizes the objective function of interest and thereby avoids making approximations of other objective functions for example, likelihood or margin. However, the MERT technique is generally efficient for training model parameters (i.e., weights) for only a relatively small number of feature functions (e.g., less than 20 or 30 feature functions). The MERT technique is slow if a large number of feature functions are considered, because only one feature function is updated at a time and the computation involves iterating over the complete training corpus. Additionally, in the case of highly correlated features, the MERT technique tends to assign most of the weight to one of the correlated features, causing instability. Instability in the MERT technique occurs when different values of the initial weights result in very different final weights.

SUMMARY

Systems, methods, and apparatuses including computer program products for machine learning are provided. In general, in one aspect, a method is provided. The method includes determining model parameters for a plurality of feature functions for a linear machine learning model, ranking the plurality of feature functions according to a quality criterion, and selecting, using the ranking, a group of feature functions from the plurality of feature functions to update with the determined model parameters.

Other embodiments of the aspect include systems and computer program products.

Implementations can include one or more of the following features. Determining model parameters for the plurality of feature functions can further include, for each feature function in the plurality of feature functions: calculating a source sentence error surface for each source sentence of a plurality of source sentences as a function of feature function model parameter, merging the source sentence error surfaces into an aggregate error surface for the feature function, and identifying an optimal model parameter for the feature function that minimizes the aggregate error surface for the feature function. The quality criterion can be BLEU score gain.

Selecting, using the ranking, the group of feature functions to update with the determined model parameters can further include, for each source sentence in a plurality of source sentences, calculating a source sentence error surface as a function of number of updates for ranked feature functions, merging all source sentence error surfaces into an aggregate error surface, and identifying an optimal number of updates for ranked feature functions that minimizes the aggregate error surface. Selecting, using the ranking, the group of feature functions to update with the determined model parameters can further include selecting the group of feature functions to include a particular feature function if updating the particular feature function with the respective optimal model parameter does not increase an error count. The linear machine learning model can be a linear statistical machine translation model.

In general, in one aspect, a method is provided. The method includes determining a group of candidate translations for each source sentence in a plurality of source sentences, and, for one or more iterations: calculating a first aggregate error surface and an optimal model parameter for each feature function in a plurality of feature functions for a linear statistical machine translation model, ranking the plurality of feature functions according to a quality criterion, calculating a second aggregate error surface and an optimal number of updates for ranked feature functions, determining a group of feature functions from the plurality of feature functions using the optimal number of updates for ranked feature functions, where the group of feature functions includes a particular feature function if updating the particular feature function with the respective optimal model parameter does not increase an error count, and updating each feature function of the group of feature functions with the corresponding optimal model parameter.

Other embodiments of the aspect include systems and computer program products.

Implementations can include one or more of the following features. Calculating the first aggregate error surface and the optimal model parameter for each feature function can further include, for each feature function in the plurality of feature functions: for each source sentence in the plurality of source sentences: calculating a minimum cost surface as a function of feature function model parameter, and calculating a source sentence error surface using the minimum cost surface, merging the source sentence error surfaces for each source sentence into the first aggregate error surface for the feature function, and identifying the optimal model parameter for the feature function that minimizes the first aggregate error surface for the feature function. The quality criterion can be BLEU score gain.

Calculating the second aggregate error surface and the optimal number of updates for ranked feature functions can further include, for each source sentence in the plurality of source sentences: calculating a minimum cost surface as a function of number of updates for ranked feature functions, and calculating a source sentence error surface using the minimum cost surface, merging all source sentence error surfaces into the second aggregate error surface, and identifying the optimal number of updates for ranked feature functions that minimizes the second aggregate error surface.

The aspect can further include recalculating the second aggregate error surface and the optimal number of updates for ranked feature functions using the determined group of feature functions. Updating with the optimal model parameters a group of feature functions can further include updating with the optimal model parameters reduced in step size. The first aggregate error surface and the optimal model parameter for each feature function can be calculated using a first training corpus, and the second aggregate error surface and the optimal number of updates for ranked feature functions can be calculated using a second training corpus.

Calculating the first aggregate error surface and the optimal model parameter for each feature function can further include calculating the first aggregate error surface and the optimal model parameter for each feature function in parallel across a plurality of machines. Calculating the second aggregate error surface and the optimal number of updates for ranked feature functions can further include calculating the second aggregate error surface and the optimal number of updates for ranked feature functions in parallel across a plurality of machines.

Particular embodiments of the subject matter described in this specification can be implemented to realize one or more of the following advantages. The MERT technique is extended to scale to an arbitrary number (e.g., millions) of features and an arbitrary number (e.g., millions) of training examples. A translation system can efficiently calculate the effect of updating increasing groups of model parameters essentially simultaneously. Modifying step size in updates to model parameters can reduce overfitting to training data. This technique is easy to parallelize efficiently over many machines and provides solid improvements in BLEU score over previous techniques.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
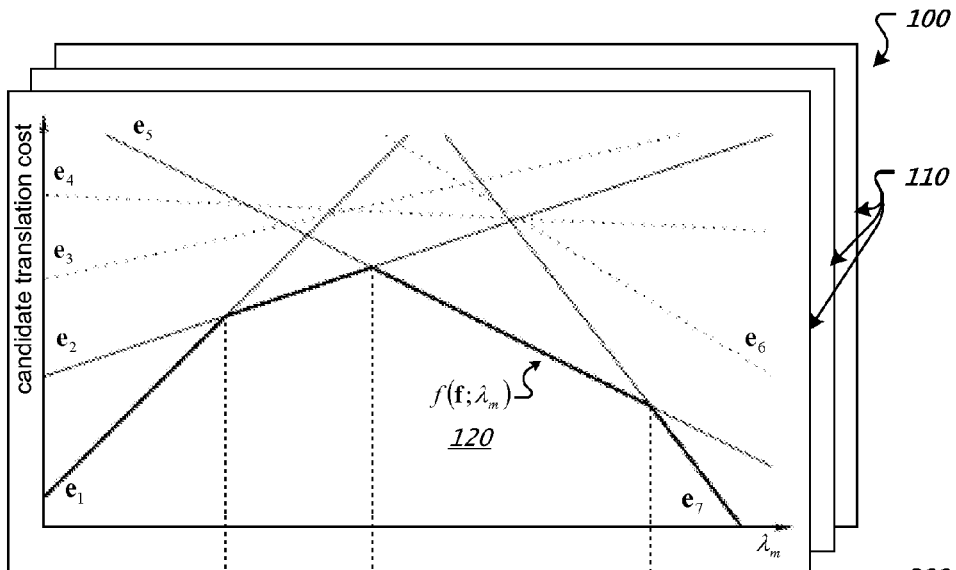
FIG. 1 is an example of a minimum cost surface for a model parameter for a single source sentence.

A commonly used training technique in statistical machine translation is the MERT technique. However, the MERT technique can also be applied to other machine learning applications and problems where parameters of a log-linear model need to be trained. The MERT technique and an extension to the MERT technique, as described below, can be used in speech recognition, optical character recognition, search ranking, and advertisement targeting, for example. The application determines the type of objective function for which parameter training is needed. For example, word error rate (e.g., how many words have been recognized correctly) can be used for speech recognition, and dialog success rate (e.g., how many dialogs have been handled successfully) can be used for dialog systems. Without loss of generality, the MERT technique and an extension to the MERT technique will be described below as applied to statistical machine translation.

An extension to the MERT technique allows a large number of features of a linear statistical machine translation model to be trained on a large number of training examples by optimizing the linear model with respect to an arbitrary error function. For example, a phrase-based statistical machine translation system can use the technique to train millions of lexicalized language model features (e.g., lexical n-gram features) to improve the BLEU score. BLEU is a method for evaluating the quality of text which has been translated from one natural language to another using machine translation. The BLEU score provides a measure of the statistical closeness of machine translations to reference translations.

An n-gram is a sequence of n consecutive words. An n-gram has an order, which is the number of words in the n-gram. For example, a 1-gram (or unigram) includes one word; a 2-gram (or bigram) includes two words. In some implementations, a translation system uses the technique to train other forms of language model features, e.g., long-distance language model features, phrase table features, or syntactic features.

For a given source sentence f in a first language (e.g., French), statistical machine translation attempts to identify the most probable target sentence e in a second language (e.g., English) given the source sentence. A model parameter $\lambda_m$ corresponds with each of group of M feature functions $h_m(e,f)$, where m=1, . . . , M. In some implementations, the model parameter $\lambda_m$ has a default value of zero. The cost of a target sentence is defined as $\Sigma_{m=1}{}^M\lambda_m h_m$ (e,f), which the statistical machine translation system will seek to minimize according to the following decision rule:

$$\hat{e}(f;\lambda_1^M) = \underset{e}{\operatorname{argmin}}\left\{\sum_{m=1}^M \lambda_m h_m(e,f)\right\} \quad \text{(Eqn. 1)}$$

The translation system identifies as $\hat{e}(f;\lambda_1{}^M)$ the target sentence e (e.g., where e is in a group C of multiple target sentences) for which the cost, as defined by Eqn. 1, has the smallest value. The modeling problem includes developing suitable feature functions $h_1{}^M$ that capture the relevant properties of the translation task. The training problem focuses on identifying suitable model parameter values $\lambda_1{}^M$.

One assumption made by the translation system is that the number of errors in target sentence e is calculated by comparing the target sentence e with a reference translation r using a function E(r,e). Another assumption is that the number of errors for a group of target sentences $e_1{}^s$ and the corresponding group of reference translations rlS are obtained by summing the errors for the individual target sentences: $E(r_1{}^s, e_1{}^s) = \Sigma_{s=1}{}^s E(r_s, e_s)$.

A single error count is typically insufficient to calculate corpus-wide scores (i.e., scores calculated across a representative corpus of source sentences) for common metrics including, for example, a BLEU score or F-Measure. However, it is typically straightforward to accumulate the sufficient statistics to calculate such corpus-level scores.

The BLEU score is described, for example, in Kishore Papineni, Salim Roukos, Todd Ward, and Wei-Jing Zhu, "BLEU: a Method for Automatic Evaluation of Machine Translation," Proceedings of the 40th Annual Meeting on the Association for Computational Linguistics, pages 311-318, July 2002. The BLEU score provides a geometric mean of the ratio of matching n-grams of length one to four between a candidate translation and a group of reference translations, along with a length term penalizing short sentences. The sufficient statistics of the BLEU score are the number of matching n-grams (i.e., n-gram precisions for the group of reference translations), the candidate translation length, and the effective length of the reference translations of the group.

As part of parameter training, the translation system obtains a minimal error count on a representative corpus of source sentences $f_1{}^S$, given reference translations $r_1{}^s$ and a group $C_s = \{e_{s,1}, \ldots, e_{s,N}\}$ of N different candidate translations (i.e., target sentences) for each source sentence $f_s$. The error count for a specific sentence s, which for notational simplicity will be referred to as $E_s(\lambda_1{}^M)$, is given by:

$$E_s(\lambda_1^M) = \Sigma_{k=1}^N (r_s, e_{s,k}) \delta(\hat{e}(f_s; \lambda_1^M), e_{s,k}) \quad \text{(Eqn. 2)}$$

The $\delta(\hat{e}(f_s; \lambda_1{}^M), e_{s,k})$ function of Eqn. 2 is the Kronecker delta function, which is equal to 1 when $\hat{e}(f_s; \lambda_1{}^M)$ is equal to $e_{s,k}$ and 0 otherwise. The translation system obtains the optimal parameter values by minimizing the sum of the errors over all source sentences in the representative corpus:

$$\hat{\lambda}_1^M = \underset{\lambda_1^M}{\operatorname{argmin}}\left\{\sum_{s=1}^S E_s(\lambda_1^M)\right\} \quad \text{(Eqn. 3)}$$

This optimization criterion is computationally difficult as the objective function has a large number of local optima, is piecewise constant, and does not allow the computation of a gradient.

The MERT technique can be the basis for the extension technique described in further detail below. The MERT technique trains parameters for a linear statistical machine translation model directly with respect to an automatic evaluation criterion (e.g., the BLEU score) that measures translation quality. A globally optimal value for each model parameter $\lambda_m$ is identified while holding all other model parameters fixed. Each corresponding feature function $h_m$(e,f) is updated greedily in turn (i.e., by applying the optimal value as a model parameter for the particular feature function $h_m$(e,f) without regard to other feature functions).

The MERT technique includes several steps: calculating a minimum cost surface function for each source sentence $f_s$ of a representative corpus; calculating an error surface $E_s(\lambda_m)$ for each source sentence $f_s$ of the representative corpus; calculating an aggregate error surface $E(\lambda_m)$ across all source sentences $f_1{}^S$ of the representative corpus; and identifying a globally optimal model parameter $\hat{\lambda}_m$, which minimizes the aggregate error surface $E(\lambda_m)$.

To find the lowest-cost (e.g., as defined by Eqn. 1) of a group $C = \{e_1, \ldots, e_N\}$ of candidate translations (i.e., target sentences) as a function of $\lambda_m$, the translation system solves an optimization problem of the following functional form:

$$\hat{e}(f;\lambda_m) = \underset{e \in C}{\operatorname{argmin}}\{K(e, f) + \lambda_m h_m(e, f)\} \quad \text{(Eqn. 4)}$$

$K(e,f) = \Sigma_{m' \neq m}\lambda_{m'} h_{m'}$(e,f), which corresponds to the weighted feature function sum excluding the feature m that is being optimized. Therefore, K(e,f) is a constant with respect to $\lambda_m$. If cost is plotted as a function of $\lambda_m$, every candidate translation e∈C corresponds to a line with slope $h_m$(e,f), as illustrated in the example 100 of FIG. 1. The minimum cost surface $f(f; \lambda_m)$ 120 for the model parameter $\lambda_m$ for a source sentence $f_s$ has the following functional form:

$$f(f;\lambda_m) = \underset{e \in C}{\min}\{K(e, f) + \lambda_m h_m(e, f)\} \quad \text{(Eqn. 5)}$$

The minimum cost surface $f(f; \lambda_m)$ 120, illustrated as the bold line in FIG. 1, is piecewise linear, where each piece corresponds to the particular candidate translation e with the lowest cost at the corresponding value of the model parameter $\lambda_m$.

The example 100 of FIG. 1 represents a stack of candidate translation cost plots 110, where each cost plot 110 is for a particular source sentence $f_s$ from the group of source sentences $f_1{}^s$ of the representative corpus. The translation system calculates the respective minimum cost surface $f(f; \lambda_m)$ 120 for each source sentence $f_s$.

As described above, each candidate translation e∈C has an associated error count function defined by $E_s$(r,e). Using this error function, the translation system calculates the error surface (i.e., an error count) for each candidate translation e in the minimum cost surface $f(f; \lambda_m)$ 120. This error surface is the source sentence error surface $E_s(\lambda_m)$ as a function of $\lambda_m$, which defines the error count of the minimum cost surface $f(f; \lambda_m)$ 120 at every possible value of $\lambda_m$. The source sentence error surface $E_s(\lambda_m)$ for a specific sentence s, which is illustrated in the example 200 of FIG. 2, is given by:

$$E_s(\lambda_m) = \Sigma_{k=1}^N E(r_s, e_{s,k}) \delta(\hat{e}(f_s; \lambda_m), e_{s,k}) \quad \text{(Eqn. 6)}$$

Figure 2:
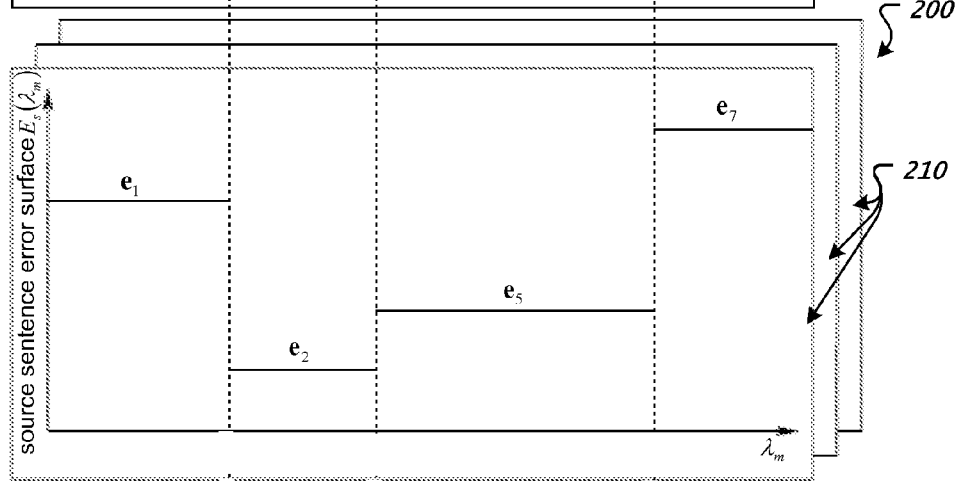
FIG. 2 is an example of a source sentence error surface for a single source sentence corresponding to the example minimum cost surface of FIG. 1.

The example 200 of FIG. 2 represents a stack of source sentence error surface $E_s(\lambda_m)$ plots 210, where each error surface plot 210 is for a particular source sentence $f_s$ from the group of source sentences $f_1^s$.

Figure 3:
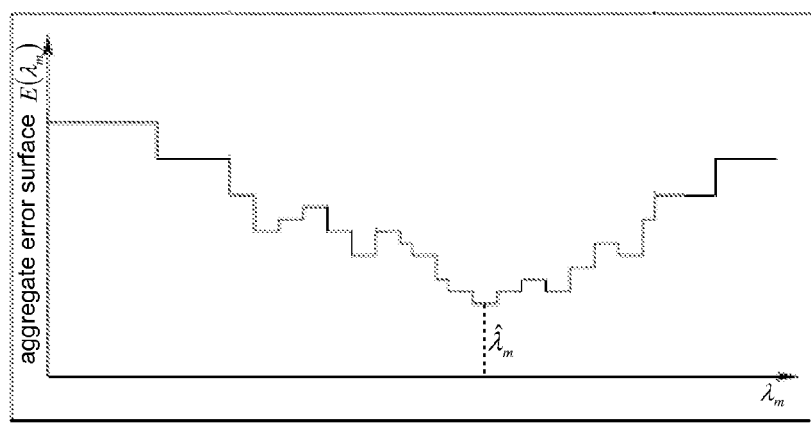
FIG. 3 is an example of an aggregate error surface over all source sentences, showing the optimal model parameter.

Once the translation system has calculated source sentence error surfaces $E_s(\lambda_m)$ for all source sentences $f_1^s$ of the representative corpus, the translation system aggregates error counts while traversing in parallel the source sentence error surfaces $E_s(\lambda_m)$ The example 300 of FIG. 3 illustrates the aggregate error surface $E(\lambda_m)=\Sigma_{s=1}^S E_s(\lambda_m)$ as a function of $\lambda_m$ calculated across the stack of source sentence error surface $E_s(\lambda_m)$ plots 210. The translation system identifies the globally optimal model parameter $\lambda_m$, which minimizes the aggregate error surface $E(\lambda_m)$. That is, $$\hat{\lambda}_m = \underset{\lambda_m}{\mathrm{argmin}}\{E(\lambda_m)\}.$$

The model parameter $\lambda_m$ for the feature function $h_m(e,f)$ can then be updated to the identified optimal parameter value $\hat{\lambda}_m$.

The overall MERT optimization technique therefore includes the following steps:

1. ERROR SURFACE CALCULATION: For each source sentence $f_s$, calculate the piecewise linear minimum cost surface $f(f; \lambda_m)$ and its associated source sentence error surface $E_s(\lambda_m)$ as functions of $\lambda_m$.

2. MERGING AND MINIMIZATION: Merge all source sentence error surfaces $E_s(\lambda_m)$ into the aggregate error surface $E(\lambda_m)$ and identify the optimal parameter value $\hat{\lambda}_m$, which minimizes the aggregate error surface $E(\lambda_m)$.

The MERT technique is generally efficient for only a relatively small number of features and does not scale well to a large number of features, because only one feature is updated at a time and the computation involves iterating over the complete training corpus. However, an extension of the MERT technique allows the effect of updating increasing groups of features (i.e., batch updates) to be efficiently calculated at once. Further efficiencies are gained by parallelizing the MERT technique and the extension technique, including the efficient batch updates, over many machines.

Figure 10:
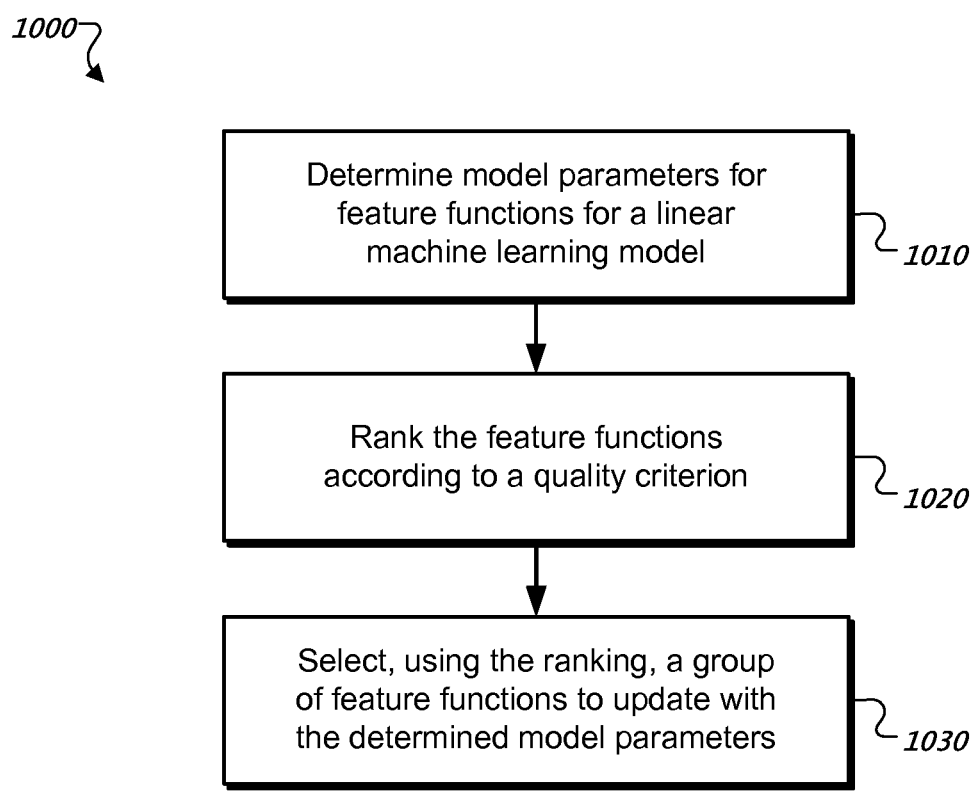
FIG. 10 shows an example process for selecting a group of feature functions to update with determined model parameters.

FIG. 10 shows an example process 1000 for selecting a group of feature functions to update with determined model parameters. The example process 1000 illustrates one technique for extending the MERT technique for batch updating a large number of feature functions. For convenience, the example process 1000 will be described with reference to a translation system that performs the process 1000.

A translation system determines model parameters for multiple feature functions for a linear machine learning model (step 1010). In some implementations, the linear machine learning model is a linear statistical machine translation model. The model parameters can be determined using the MERT technique described above. The translation system ranks the multiple feature functions according to a quality criterion (step 1020). The translation system selects, using the ranking, a group of feature functions from the multiple feature functions to update with the determined model parameters (step 1030). Typically, the group of feature functions does not include all of the multiple feature functions. Ranking of the feature functions and selection of the group of feature functions will be described in more detail below.

Figure 11:
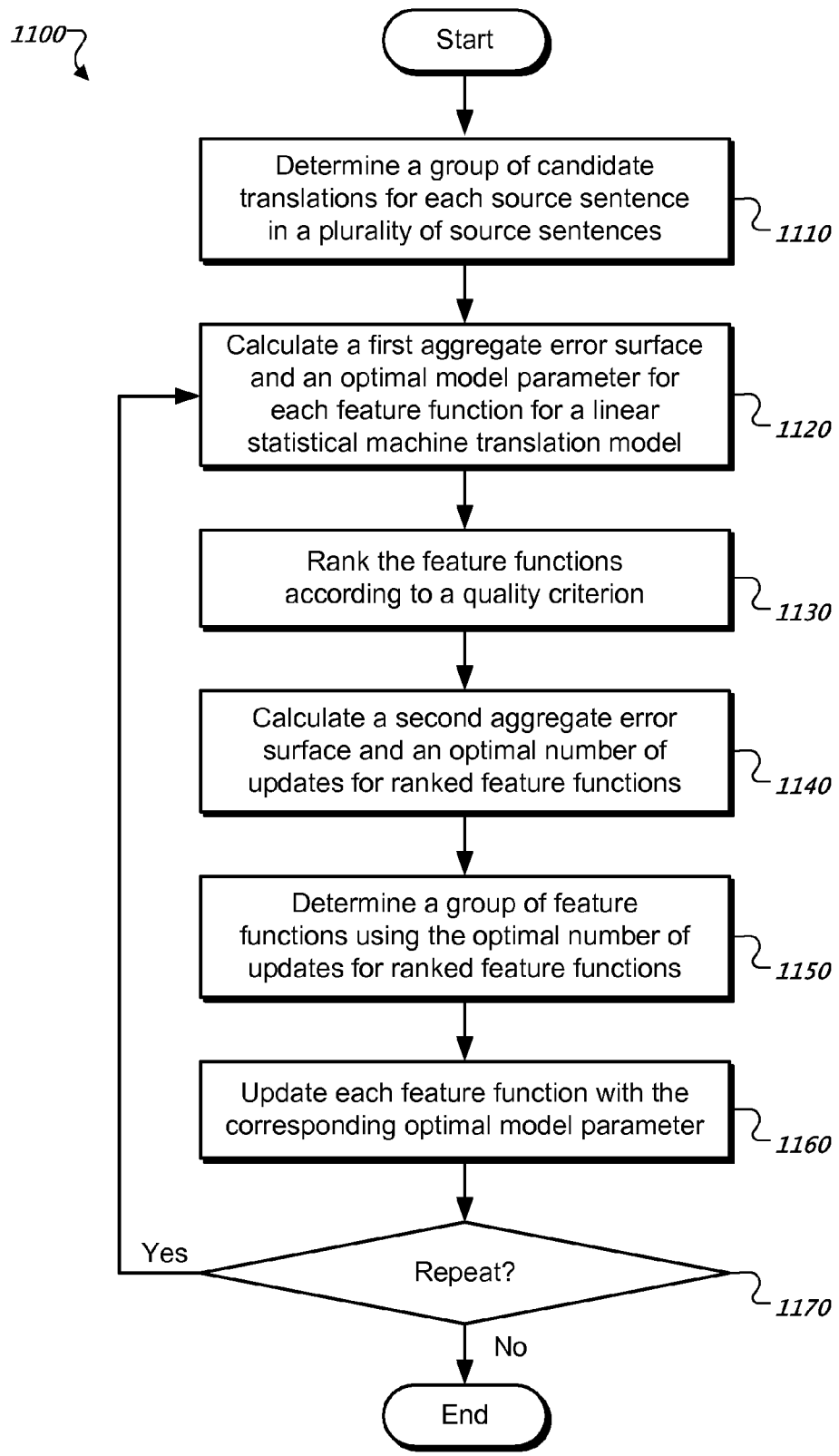
FIG. 11 shows an example process for minimum error rate training with batch updating and feature decorrelation filtering.

FIG. 11 shows an example process 1100 for minimum error rate training with batch updating and feature decorrelation filtering. For convenience, the example process 1100 will be described with reference to FIGS. 4-6 and a translation system that performs the process 1100.

The translation system determines a group of candidate translations for each source sentence of multiple source sentences (step 1110). The translation system can use a decoder to apply a language model (e.g., a syntactic language model) and a translation model (e.g., word alignment or phrase-based translation) to the respective source sentence in order to determine each candidate translation in the group of candidate translations. In particular, for a source sentence f, the decoder can determine the candidate sentence e, that maximizes the product of P(e) (i.e., the probability of e) determined by the language model and P(f|e) (i.e., the conditional probability of f given e) determined by the translation model.

The translation system calculates a first aggregate error surface and an optimal model parameter for each feature function of multiple feature functions for a linear statistical machine translation model (step 1120). For example, the first aggregate error surfaces and the optimal model parameters can be calculated using the MERT technique. The translation system ranks the plurality of feature functions according to a quality criterion (step 1130). As described above, the MERT technique identifies an optimal parameter value $\hat{\lambda}_m$ for each feature function $h_m$. The aggregate error surface $E(\hat{\lambda}_m)$ at the optimal parameter value $\hat{\lambda}_m$ is a measure of the quality of the corresponding feature function $h_m$. The translation system can rank the feature functions $h_1^M$ by quality, for example, by the gain in the evaluation metric (e.g., a gain in BLEU score). For the following analysis, it is assumed that the feature functions $h_1^M$ are sorted according to quality, such that $E(\hat{\lambda}_m) \leq E(\hat{\lambda}_{m-1})$.

With the ordered list of feature functions $h_1^M$, the translation system determines which subgroup of feature function updates results in a minimal error count. The problem can be simplified by using the quality ranking of the feature functions and restricting the considered subgroups to the M subgroups ordered by quality:

$$\{\{h_1\}, \{h_1, h_2\}, \ldots, \{h_1, \ldots, h_M\}\}$$

Using only the first m ordered feature functions (i.e., $h_i(e,f)$, where $i=1, \ldots, m$) to rank the candidate translations, the translation system obtains the following decision rule for finding the lowest-cost candidate translation out of the group of candidate translations $C=\{e_1, \ldots, e_N\}$:

$$\hat{e}(f; m) = \underset{e \in C}{\mathrm{argmin}}\left\{\sum_{i=1}^m \hat{\lambda}_i h_i(e, f)\right\} \quad \text{(Eqn. 7)}$$

In the corresponding Eqn. 4, each candidate translation $e \in C$ corresponds to a line when cost is plotted as a function of $\lambda_m$. In contrast, in Eqn. 7, each candidate translation $e \in C$ corresponds to a piecewise constant surface, as illustrated in the example 400 of FIG. 4, when cost is plotted as a function of m. As plotted, the cost of a particular candidate translation e for a number of updates m is the cost if the feature functions $h_1^m$ are updated by applying the corresponding optimal model parameters $\hat{\lambda}_1^m$. This allows the effect of updating multiple subgroups of feature functions (i.e., $\{\{h_1\}, \{h_1, h_2\}, \ldots, \{h_1, \ldots, h_M\}\}$) to be efficiently calculated at once for comparison.

Figure 4:
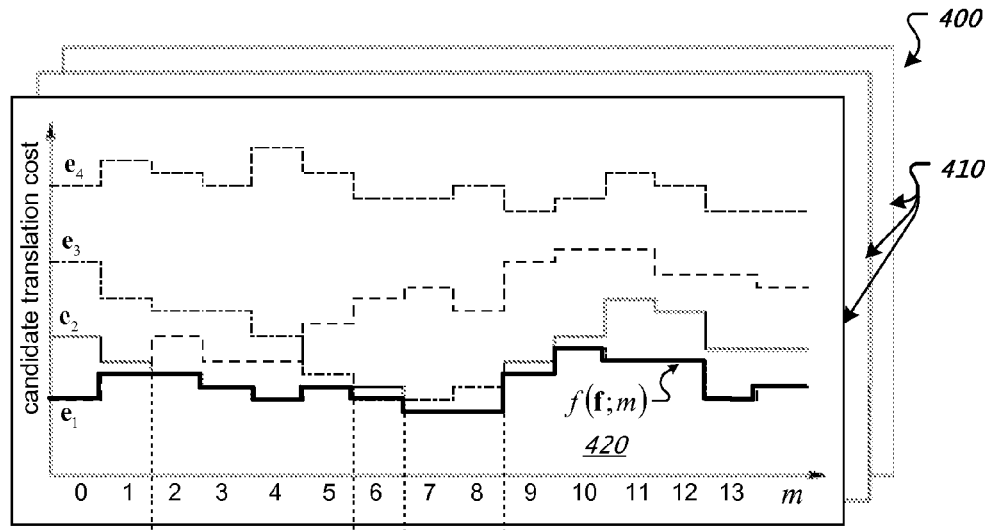
FIG. 4 is an example of a minimum cost surface for the number of updates for a single source sentence.

The minimum cost surface $f(f; m)$ 420 for the number of updates m for a source sentence $f_s$ is defined by the function $$f(f;m) = \min_{e \in C} \left\{ \sum_{i=1}^{m} \lambda_i h_i(e,f) \right\}$$ (Eqn. 8)

forming the lower boundary, illustrated as the bold line, of FIG. 4. Each section of the piecewise constant minimum cost surface f (f; m) 420 corresponds to the cost of the candidate translation e with the lowest cost for the particular number of updates m. The example 400 of FIG. 4 represents a stack of candidate translation cost plots 410, where each cost plot 410 is for a particular source sentence $f_s$ from the group of source sentences $f_1^s$ of the representative corpus. The translation system calculates the respective minimum cost surface f (f; m) 420 for each source sentence $f_s$.

Each candidate translation e∈C has an associated error count function defined by $E_s(r,e)$. Using the error count function $E_s(r,e)$, the translation system can obtain the error surface (i.e., an error count) for each candidate translation e∈C in the minimum cost surface f (f; m) 420, as illustrated in the example 500 of FIG. 5. This error surface is the source sentence error surface $E_s(m)$, which defines the error count of the minimum cost surface f (f; m) 420 at the values of m. The source sentence error surface $E_s(m)$ as a function of m is given by:

$$E_s(m) = \Sigma_{k=1}^{N} E(r_s, e_{s,k}) \delta(\hat{e}) \delta(\hat{e}(f_s;m), e_{s,k})$$ (Eqn. 9)

Figure 5:
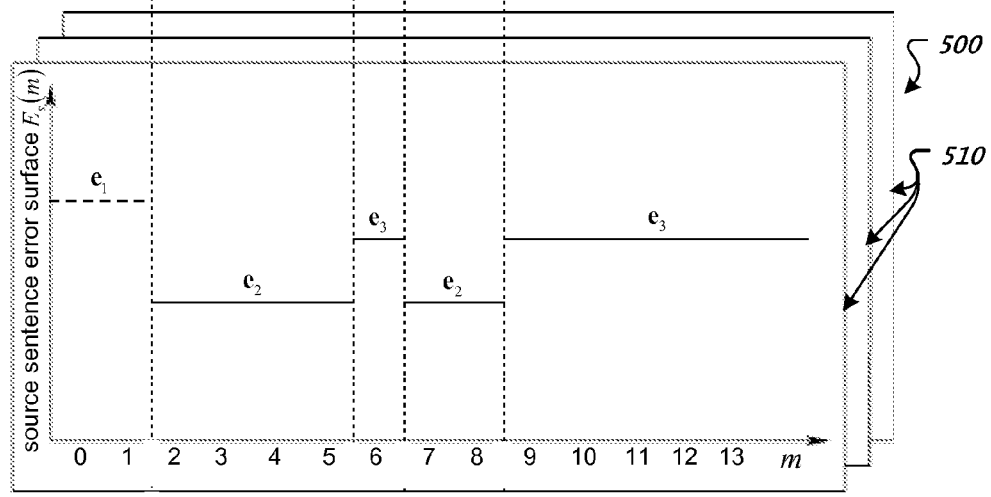
FIG. 5 is an example of a source sentence error surface for a single source sentence corresponding to the example minimum cost surface of FIG. 4.

The example 500 of FIG. 5 represents a stack of source sentence error surface $E_s(m)$ plots 510, where each error surface plot 510 is for a particular source sentence $f_s$ from the group of source sentences $f_1^s$. The translation system calculates source sentence error surfaces $E_s(m)$ for all source sentences $f_1^s$ of the representative corpus.

Figure 6:
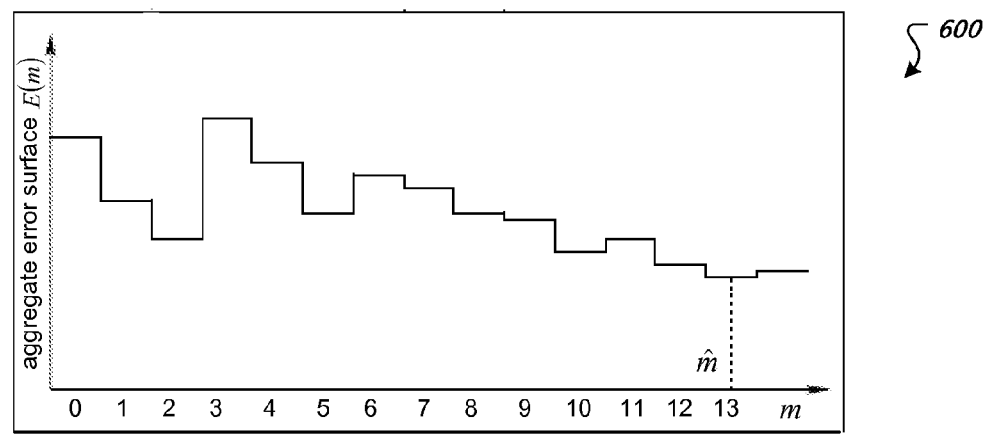
FIG. 6 is an example of an aggregate error surface over all source sentences, showing the optimal number of updates.

As shown in FIG. 11, the translation system calculates a second aggregate error surface and an optimal number of ranked feature function updates (step 1140). The translation system traverses the source sentence error surface $E_s(m)$ for all source sentences $f_1^s$ in parallel, accumulating their error counts into the aggregate error surface $E(m) = \Sigma_{s=1}^{S} E_s(m)$. The example 600 of FIG. 6 illustrates the aggregate error surface E(m) as a function of m calculated across the stack of source sentence error surface $E_s(m)$ plots 510. The translation system identifies the optimal number of updates m (i.e., updates 1, ..., m̂), which minimizes the aggregate error surface E(m). That is, $$\hat{m} = \operatorname*{argmin}_{m} \{E(m)\}.$$

The translation system determines a group of feature functions from the multiple feature functions using the optimal number of ranked feature function updates (step 1150). The translation system updates each feature function of the group of feature functions with the corresponding optimal model parameter (step 1160). The translation system applies the optimal parameter values $\hat{\lambda}_1^{\hat{m}}$ to update the corresponding feature functions in the determined subgroup $\{h_1, \ldots, h_{\hat{m}}\}$ while retaining the present values $\lambda_m$ for all feature functions not in the subgroup $\{h_1, \ldots, h_{\hat{m}}\}$.

The translation system repeats step 1120 through step 1160 of example process 1100 if multiple iterations are to be performed (decision 1170). For example, the number of iterations can be determined using a threshold, e.g., a convergence criterion or a minimum gain in the evaluation metric.

The efficient batch update technique therefore includes the following steps:

1. ERROR SURFACE CALCULATION: For each source sentence $f_s$, calculate the piecewise constant minimum cost surface f(f; m) 420 and its associated source sentence error surface $E_s(m)$ as functions of m.

2. MERGING AND MINIMIZATION: Merge all source sentence error surfaces $E_s(m)$ into the aggregate error surface E(m) and identify the optimal number of updates m, which minimizes the aggregate error surface E(m).

The steps of the efficient batch update technique mirror the steps of the MERT technique. However, the resulting aggregate error surfaces are different. Instead of being a function of $\lambda_m$, the aggregate error surface in step 2 of the efficient batch update is a function of m. Overall, the batch update technique is generally efficient. In step 1, the translation system only processes the complete group of N·S candidate translations once. Additionally, for each candidate translation e∈C, the translation system only iterates through all non-zero optimal parameter values $\hat{\lambda}_m$. In step 2, the translation system iterates through the non-trivial decision boundaries of the S sentence-specific error surfaces $E_s(m)$.

Although the translation system can efficiently calculate the impact of updating millions of feature functions, problems can exist if there are correlated features. Correlated features are common in machine learning problems. For example, strong correlations can occur in translation systems using individual n-grams as features. Strong correlations can be expected between n-grams that subsume or are subsumed by each other. For example, the effects of updating the features "of" and "of the" by applying the identified optimal parameters values $\hat{\lambda}_m$ are expected to be highly correlated, which suggests that it might be better not to update the features together.

In some implementations, the translation system avoids applying the optimal parameter value $\hat{\lambda}_m$ (i.e., the feature weight) to update a feature if the update leads to an increase in the error count. Instead, the optimal parameter value $\hat{\lambda}_m$ for the detrimental feature is not applied (i.e., the feature model parameter remains at its present value $\lambda_m$). The translation system can then repeat the steps (i.e., run another iteration) of the batch update technique to produce a new aggregate error surface E(m) without including the updates to the detrimental features. Each iteration of this filtering step typically reduces the resulting error count.

Figure 7:
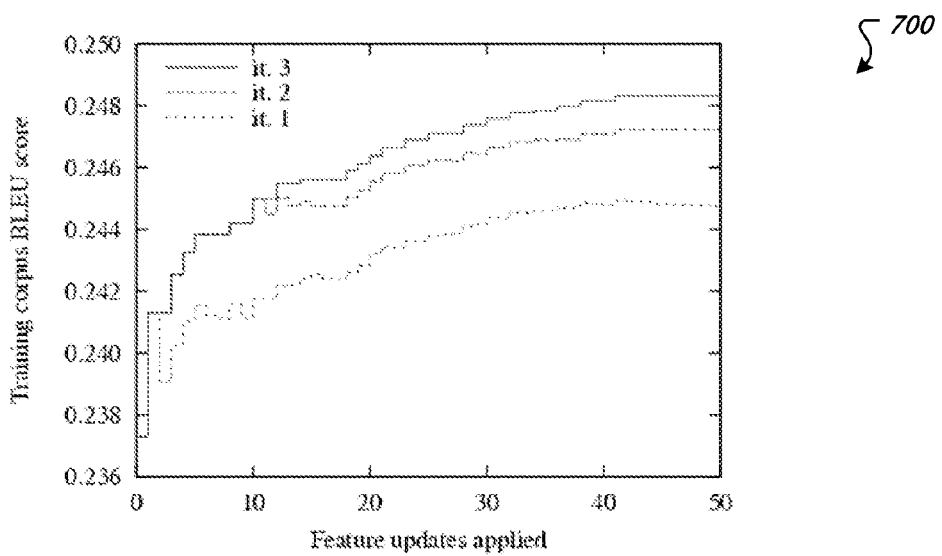
FIG. 7 is an example of training corpus BLEU scores for the top ranked 50 features for three iterations of batch updating, where feature decorrelation filtering follow batch updating in iterations 1 and 2.
Figure 8:
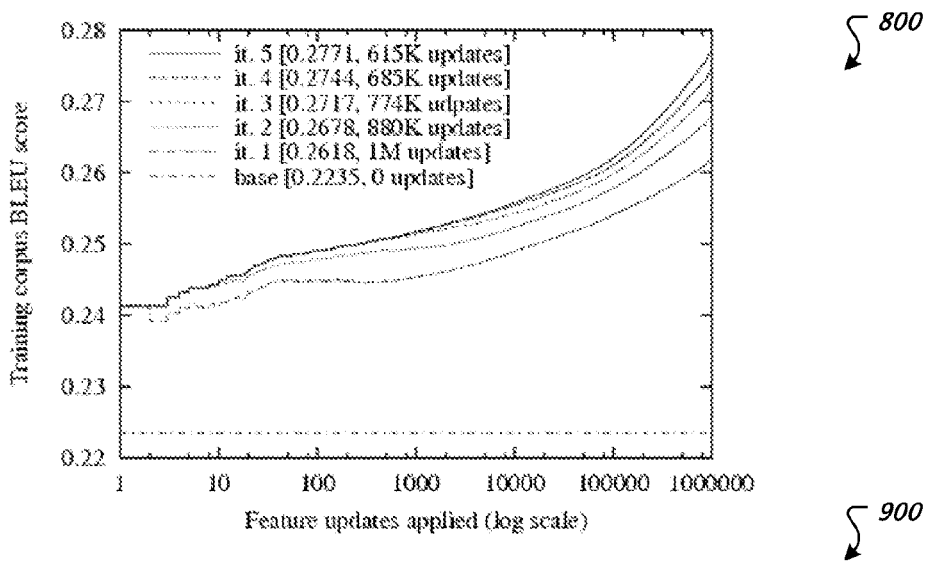
FIG. 8 is an example of the training corpus BLEU scores of FIG. 7 for the top ranked million features for five iterations of batch updating, where feature decorrelation filtering follow batch updating in iterations 1 through 4.

Table 1 and FIGS. 7-8 illustrate an example of this feature decorrelation filtering for a translation system using the BLEU score as an evaluation metric. Because the BLEU score is the evaluation metric, the goal is to maximize the score as opposed to minimizing an error count (e.g., an aggregate error surface).

Table 1 illustrates an example of the top seven n-gram features ranked by gain in the BLEU score, where the gain in the BLEU score is calculated under the assumption that the translation system updates each feature individually. As mentioned above, the effects of updating the second feature ("of") and the third feature ("of the") are expected to be highly correlated.

TABLE 1

Example top seven n-gram features

| Index | Feature | BLEU score gain | Calculated optimal parameter $\hat{\lambda}_m$ |
|---|---|---|---|
| 1 | "the" | 0.237304 | −6.57 |
| 2 | "of" | 0.234246 | −7.93 |
| 3 | "of the" | 0.231457 | −10.10 |

TABLE 1-continued

Example top seven n-gram features

| Index | Feature | BLEU score gain | Calculated optimal parameter $\lambda_m$ |
|---|---|---|---|
| 4 | "to" | 0.225307 | −4.65 |
| 5 | "in" | 0.225246 | −6.92 |
| 6 | "The" | 0.224727 | −7.80 |
| 7 | "in the" | 0.224697 | −6.38 |

FIG. 7 illustrates an example 700 of the training corpus BLEU scores for the top ranked 50 features for three iterations of batch updating, where feature decorrelation filtering follows batch updating in iterations 1 and 2. In iteration 1, there is a sharp drop in the BLEU score after applying the update for the third feature ("of the"), confirming the expected high correlation with the update for the second feature ("of"). After the feature decorrelation filtering of iteration 1, the translation system does not include the third feature update and, as a result, the drop does not appear in the BLEU score in the next iteration (i.e., iteration 2). After the batch updating of iteration 2, the translation system does not include updates to all features identified in iteration 2 as reducing the BLEU score.

FIG. 8 illustrates an example 800 of the training corpus BLEU scores of FIG. 7 for the top ranked million features for five iterations of batch updating, where feature decorrelation filtering follows batch updating in iterations 1 through 4. The final BLEU score and number of remaining updated features are displayed for each iteration. The baseline score represents a phrase-based statistical machine translation system with twenty different baseline features. FIG. 8 illustrates that the feature decorrelation filtering is also effective for a large number of features, improving the BLEU score with each iteration.

Combining the MERT technique with batch updating and feature decorrelation filtering results in a technique that includes the below steps:

DECODE: determine candidate translations $C_s = \{e_{s,1}, ..., e_{s,N}\}$ for all source sentences $f_1^S$
FOR i = 1, ..., I iterations:
    MERT: calculate for each feature $h_m$ the aggregate error surface $E(\lambda_m)$
    RANK: sort features by quality, such that $E(\hat{\lambda}_m) \leq E(\hat{\lambda}_{m+1})$
    FOR j = 1, ..., J iterations:
        BATCH: calculate the aggregate error surface E(m)
        FILTER: remove detrimental features
    Update optimal parameter values $\hat{\lambda}_m$ for non-detrimental features In the DECODE step, the translation system translates the training corpus, which potentially includes millions of source sentences, and produces an N-best list of candidate translations $C_s$ for each source sentence $f_s$. An N-best list of candidate translations $C_s$ is a list of the top N candidate translations for the respective source sentence $f_s$ as determined by, for example, translation scores or confidence estimations. The remaining steps can be implemented as described above. In some implementations, the numbers of iterations I and J are fixed. In other implementations, the numbers of iterations I and J are determined using a threshold, e.g., a convergence criterion or a minimum gain in the evaluation metric.

Figure 9:
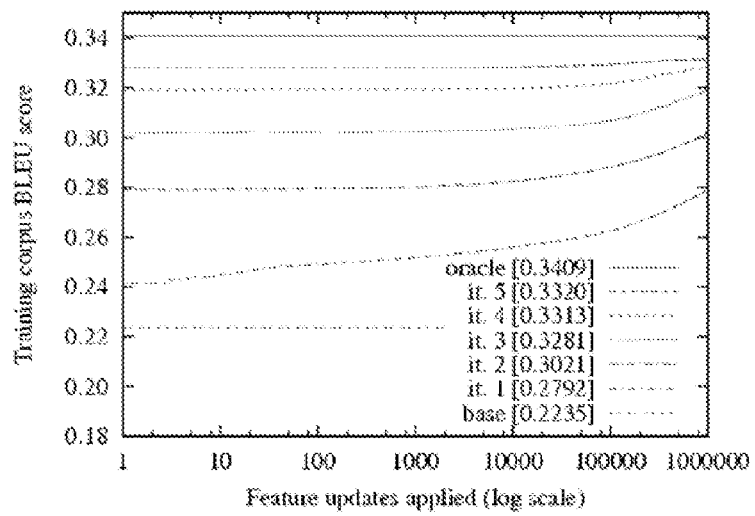
FIG. 9 is an example of training corpus BLEU scores for one through five iterations of the MERT technique, each with five iterations of batch updating and feature decorrelation filtering.

FIG. 9 illustrates an example 900 of the training corpus BLEU scores for i=1, . . . , 5 and J=5. The training corpus BLEU score increases with each iteration of the combined technique and quickly approaches the oracle score. The oracle score represents the BLEU score that would be achieved if the translation system picked the optimal candidate translation for each source sentence, using a known translation score for each candidate translation. Overall, in the MERT and BATCH steps of the combined technique, the translation system processes the training corpus (i.e., the corpus of source sentences $f_1^s$) I·(J+1) times.

The batch updating and feature decorrelation filtering can be used with other machine learning techniques for linear models and not just the MERT technique. For example, a translation system can use conditional-random fields or the Perceptron algorithm to learn feature function model parameters for a linear model, rank the features according to different quality criteria, and use the batch updating and feature decorrelation filtering to select an optimal group of features according to the BLEU score, the NIST score, or another automatic evaluation metric.

As illustrated in FIG. 9, the combined technique performs well on training data. However, in some cases, the performance of the combined technique may suffer due to overfitting to training data. In one example of overfitting, the combined technique adapts to certain stylistic preferences in the training corpus. When the test data are very different from the training data, the overfit feature model parameters might not improve and might even deteriorate the quality of the translations.

In some implementations, the translation system reduces the step size of a feature model parameter update to reduce overfitting. That is, instead of immediately updating each feature model parameter from its current value $\lambda_m$ to its optimal value $\hat{\lambda}_m$, the translation system sets the feature model parameter to an intermediate value, $\lambda_m + \gamma(\hat{\lambda}_m - \hat{\lambda}_m)$, using a step size parameter $\gamma$ (e.g., $\gamma=0.1$). Smaller step sizes can also reduce the problem of instability in the case of correlated features. In some cases, reducing the step size might increase the number of iterations needed to reach a determined threshold for the evaluation metric.

Other techniques to reduce overfitting are possible. For example, the translation system can calculate the aggregate error surface E(m) and hence, the optimal number of updates $\hat{m}$, using training data that is different from the training data used to determine the optimal feature model parameters $\hat{\lambda}_m$. A much smaller training corpus is needed to determine the optimal number of updates $\hat{m}$ than is needed to determine the optimal feature model parameters $\hat{\lambda}_m$, because only one parameter, $\hat{m}$, is being optimized. In another example, the translation system can limit the number of considered features by retaining, after ranking features by quality, a determined number of features for the batch updating. Alternatively, the translation system only uses those features that occur in a determined number of sentences.

Training a large number of features for machine translation over very large training corpora is computationally challenging. However, the combined technique of MERT, batch updating, and correlated feature filtering, can be parallelized over many machines using an efficient distributed implementation, for example, using the MapReduce programming model. The MapReduce programming model is described, for example, in Jeffrey Dean and Sanjay Ghemawat, "MapReduce: Simplified Data Processing on Large Clusters," Proceedings of the 6th Symposium on Operating Systems Design and Implementation, pages 137-150, December 2004.

MapReduce is a powerful programming model for processing large data sets. The basic paradigm is borrowed from functional programming and requires the user to provide two functions: map and reduce. The map function processes a single key and value pair from the input and produces a set of intermediate key and value pairs. The reduce function merges all values associated with a single intermediate key, producing a set of output values. MapReduce's run-time system handles the details of coordination among thousands of machines. The strength of MapReduce lies in parallel execution. Typically, the map function is replicated on different machines operating on different parts of the input data. The intermediate data is partitioned by the intermediate key so that the reduce function can also be executed in parallel. Because there are no dependencies among map workers or among reduce workers, the parallelization of each step is highly efficient.

Each of the three components (i.e., DECODE, MERT, and BATCH) of the combined technique described above corresponds to one MapReduce.

For the DECODE step, MapReduce is used solely to handle parallelization. The input to this step includes the training corpus sentences $f_1^s$. The map function implements the actual translation process and outputs an N-best list of candidate translations $C_s$ for each input sentence $f_s$. The reduce function outputs these N-best lists into a distributed file representation.

The input to the MERT step includes the group of all N-best lists output from the DECODE step. The map function calculates the error surface $E_s(\lambda_m)$ for a single sentence. For example, each machine can independently calculate the error surface for a respective sentence $E_s(\lambda_m)$. The reduce function merges all error surfaces $E_s(\lambda_m)$ for a single feature $h_m$, producing the aggregate error surface $E(\lambda_m)$ and identifying the optimal value $\hat{\lambda}_m$ for the feature over the entire corpus.

The input to the BATCH step includes the output from the DECODE and MERT steps. The map function reads the output of the MERT step and calculates the error surface for a single sentence $E_s(m)$. The reduce function merges all error surfaces $E_s(m)$ to produce an aggregate error surface $E(m)$. This reduce function can be effectively identical to the reduce function for the MERT step.

Combining the MERT technique with batch updating and feature decorrelation filtering results in a technique that can efficiently train a large number of features and improve the BLEU score over conventional statistical machine translation systems. This technique can improve translation quality for many applications of statistical machine translation, including automatic translation of text content on the Internet and military applications. The technique can also be applied to other problems where parameters of a log-linear model need to be trained.

Figure 12:
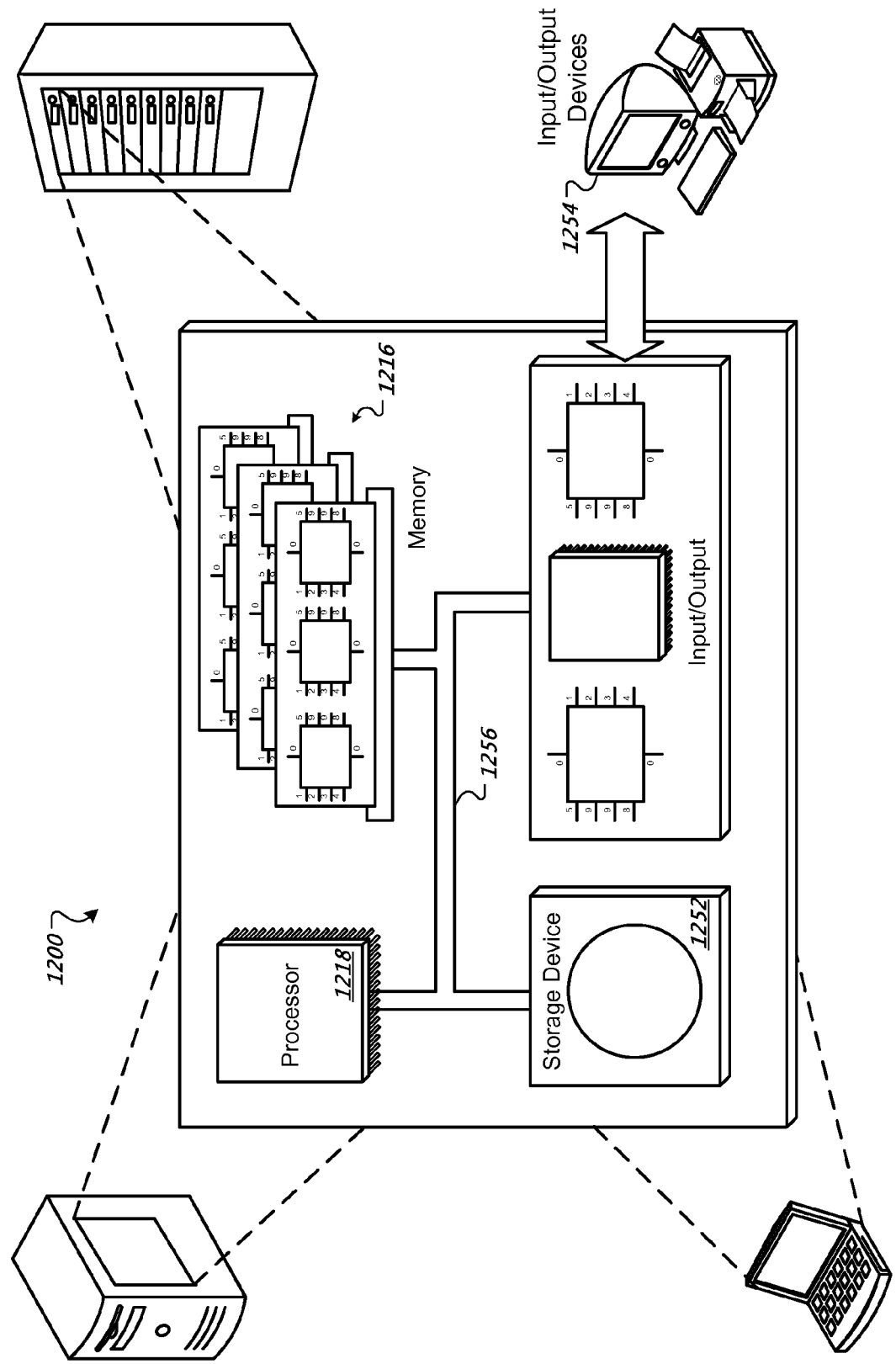
FIG. 12 is a schematic diagram of an example computer system.

FIG. 12 is a schematic diagram of an example computer system 1200. The system 1200 can be used for performing the actions and methods described above. The system 1200 can include a processor 1218, a memory 1216, a storage device 1252, and input/output devices 1254. Each of the components 1218, 1216, 1252, and 1254 are interconnected using a system bus 1256. The processor 1218 is capable of processing instructions within the system 1200. These instructions can implement one or more aspects of the systems, components, and techniques described above. In some implementations, the processor 1218 is a single-threaded processor. In other implementations, the processor 1218 is a multi-threaded processor. The processor 1218 can include multiple processing cores and is capable of processing instructions stored in the memory 1216 or on the storage device 1252 to display graphical information for a user interface on the input/output device 1254.

The memory 1216 is a computer readable medium such as volatile or non-volatile that stores information within the system 1200. The memory 1216 can store processes related to the functionality of a machine translation engine, for example. The storage device 1252 is capable of providing persistent storage for the system 1200. The storage device 1252 can include a floppy disk device, a hard disk device, an optical disk device, or a tape device, or other suitable persistent storage mediums. The storage device 1252 can store the various databases described above. The input/output device 1254 provides input/output operations for the system 1200. The input/output device 1254 can include a keyboard, a pointing device, and a display unit for displaying graphical user interfaces.

The computer system shown in FIG. 12 is but one example. In general, embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus. The tangible program carrier can be a propagated signal or a computer readable medium. The propagated signal is an artificially generated signal, e.g., a machine generated electrical, optical, or electromagnetic signal, that is generated to encode information for transmission to suitable receiver apparatus for execution by a computer. The computer readable medium can be a machine readable storage device, a machine readable storage substrate, a memory device, a composition of matter effecting a machine readable propagated signal, or a combination of one or more of them.

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described is this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter described in this specification have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A computer-implemented method comprising:
determining, with a data processing apparatus having one or more processors, model parameters for a plurality of feature functions for a linear machine learning model;
ranking, with the data processing apparatus, the plurality of feature functions according to a quality criterion;
selecting, with the data processing apparatus, a group of feature functions from the plurality of feature functions based on the ranking, where selecting the group of feature functions further comprises:
for each source sentence in a plurality of source sentences, calculating a source sentence error surface as a function of number of updates for ranked feature functions,
merging all source sentence error surfaces into an aggregate error surface, and
identifying an optimal number of updates for ranked feature functions that minimizes the aggregate error surface; and
updating, with the data processing apparatus, the model parameters for the feature functions in the selected group.

2. The method of claim 1, where determining model parameters for the plurality of feature functions further comprises:
for each feature function in the plurality of feature functions:
calculating a source sentence error surface for each source sentence of a plurality of source sentences as a function of feature function model parameter;
merging the source sentence error surfaces into an aggregate error surface for the feature function; and identifying an optimal model parameter for the feature function that minimizes the aggregate error surface for the feature function.

3. The method of claim 1, where the quality criterion is BLEU score gain.

4. The method of claim 1, where selecting the group of feature functions further comprises:
selecting the group of feature functions to include a particular feature function if updating the particular feature function with the respective optimal model parameter does not increase an error count.

5. A computer-implemented method comprising:
determining, with a data processing apparatus having one or more processors, a group of candidate translations for each source sentence in a plurality of source sentences; and for one or more iterations:
calculating, with the data processing apparatus, a first aggregate error surface and an optimal model parameter for each feature function in a plurality of feature functions for a linear statistical machine translation model;
ranking, with the data processing apparatus, the plurality of feature functions according to a quality criterion;
calculating, with the data processing apparatus, a second aggregate error surface and an optimal number of updates for ranked feature functions;
determining, with the data processing apparatus, a group of feature functions from the plurality of feature functions using the optimal number of updates for ranked feature functions, the group of feature functions including a particular feature function if updating the particular feature function with the respective optimal model parameter does not increase an error count; and
updating, with the data processing apparatus, each feature function of the group of feature functions with the corresponding optimal model parameter.

6. The method of claim 5, where calculating the first aggregate error surface and the optimal model parameter for each feature function further comprises:
for each feature function in the plurality of feature functions:
for each source sentence in the plurality of source sentences:
calculating a minimum cost surface as a function of feature function model parameter;
calculating a source sentence error surface using the minimum cost surface;
merging the source sentence error surfaces for each source sentence into the first aggregate error surface for the feature function; and
identifying the optimal model parameter for the feature function that minimizes the first aggregate error surface for the feature function.

7. The method of claim 6, wherein the minimum cost surface is calculated according to:

$$f(f; \lambda_m) = \min_{e \in C} \{K(e, f) + \lambda_m h_m(e, f)\},$$

where $f(f;\lambda_m)$ represents the minimum cost surface for a source sentence f and an optimal model parameter $\lambda_m$, C represents a group of candidate translations e, K represents a weighted feature function excluding a feature m that is being optimized, and $h_m(e,f)$ represents a slope of a line corresponding to a candidate translation e.

8. The method of claim 6, wherein the source sentence error surface is calculated according to:

$$E_s(\lambda_m) = \Sigma_{k=1}^{N} E(r_s, e_{s,k}) \delta(\hat{e}(f_s; \lambda_m), e_{s,k}),$$

where $E_s(\lambda_m)$ represents the source sentence error surface for a sentence s as a function of the optimal model parameter $\lambda_m$, k represents an index with respect to a set of N candidate translations, E(r,e) represents an error count function for a candidate translation e with respect to a reference translation r, f represents a source sentence, and $\delta(\hat{e}(f_s; \lambda_1^M), e_{s,k})$ represents a Kronecker delta function.

9. The method of claim 5, where the quality criterion is BLEU score gain.

10. The method of claim 5, where calculating the second aggregate error surface and the optimal number of updates for ranked feature functions further comprises:
for each source sentence in the plurality of source sentences:
calculating a minimum cost surface as a function of number of updates for ranked feature functions; and
calculating a source sentence error surface using the minimum cost surface;
merging all source sentence error surfaces into the second aggregate error surface; and
identifying the optimal number of updates for ranked feature functions that minimizes the second aggregate error surface.

11. The method of claim 5, further comprising:
recalculating the second aggregate error surface and the optimal number of updates for ranked feature functions using the determined group of feature functions.

12. The method of claim 5, where updating with the optimal model parameters a group of feature functions further comprises:
updating with the optimal model parameters reduced in step size.

13. The method of claim 5, where
the first aggregate error surface and the optimal model parameter for each feature function are calculated using a first training corpus; and
the second aggregate error surface and the optimal number of updates for ranked feature functions are calculated using a second training corpus.

14. The method of claim 5, where calculating the first aggregate error surface and the optimal model parameter for each feature function further comprises:
calculating the first aggregate error surface and the optimal model parameter for each feature function in parallel across a plurality of machines.

15. The method of claim 5, where calculating the second aggregate error surface and the optimal number of updates for ranked feature functions further comprises:
calculating the second aggregate error surface and the optimal number of updates for ranked feature functions in parallel across a plurality of machines.

16. A system comprising:
one or more computers configured to perform operations including:
determining model parameters for a plurality of feature functions for a linear machine learning model;
ranking the plurality of feature functions according to a quality criterion;

selecting a group of feature functions from the plurality of feature functions based on the ranking, where selecting the group of feature functions further comprises:
for each source sentence in a plurality of source sentences, calculating a source sentence error surface as a function of number of updates for ranked feature functions,
merging all source sentence error surfaces into an aggregate error surface, and
identifying an optimal number of updates for the ranked feature functions that minimizes the aggregate error surface; and
updating the model parameters for the feature functions in the selected group.

17. A system comprising:
one or more computers configured to perform operations including:
determining a group of candidate translations for each source sentence in a plurality of source sentences; and
for one or more iterations:
calculating a first aggregate error surface and an optimal model parameter for each feature function in a plurality of feature functions for a linear statistical machine translation model;
ranking the plurality of feature functions according to a quality criterion;
calculating a second aggregate error surface and an optimal number of updates for ranked feature functions;
determining a group of feature functions from the plurality of feature functions using the optimal number of updates for ranked feature functions, the group of feature functions including a particular feature function if updating the particular feature function with the respective optimal model parameter does not increase an error count; and
updating each feature function of the group of feature functions with the corresponding optimal model parameter.

18. The system of claim 17, wherein calculating the first aggregate error surface and the optimal model parameter for each feature function further comprises:
for each feature function in the plurality of feature functions:
for each source sentence in the plurality of source sentences:
calculating a minimum cost surface as a function of feature function model parameter;
calculating a source sentence error surface using the minimum cost surface;
merging the source sentence error surfaces for each source sentence into the first aggregate error surface for the feature function; and
identifying the optimal model parameter for the feature function that minimizes the first aggregate error surface for the feature function.

19. The system of claim 18, wherein the minimum cost surface is calculated according to:

$$f(f; \lambda_m) = \min_{e \in C} \{K(e, f) + \lambda_m h_m(e, f)\},$$

where $f(f;\lambda_m)$ represents the minimum cost surface for a source sentence f and an optimal model parameter $\lambda_m$, C represents a group of candidate translations e, K represents a weighted feature function excluding a feature m that is being optimized, and $h_m(e,f)$ represents a slope of a line corresponding to a candidate translation e.

20. The system of claim 18, wherein the source sentence error surface is calculated according to:

$$E_s(\lambda_m) = \Sigma_{k=1}^{N} E(r_s, e_{s,k}) \delta(\hat{e}(f_s; \lambda_m), e_{s,k}),$$

where $E_s(\lambda_m)$ represents the source sentence error surface for a sentence s as a function of the optimal model parameter $\lambda_m$, k represents an index with respect to a set of N candidate translations, E(r,e) represents an error count function for a candidate translation e with respect to a reference translation r, f represents a source sentence, and $\delta(\hat{e}(f_s;\lambda_1^M), e_{s,k})$ represents a Kronecker delta function.

* * * * *